United States Patent
Cole et al.

(10) Patent No.: US 8,325,343 B2
(45) Date of Patent: Dec. 4, 2012

(54) DETECTOR FOR CAVITY RING-DOWN SPECTROSCOPY

(75) Inventors: Barrett E. Cole, Bloomington, MN (US); James A. Cox, New Brighton, MN (US); Teresa M. Marta, White Bear Lake, MN (US); Rodney H. Thorland, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 236 days.

(21) Appl. No.: 12/658,918

(22) Filed: Feb. 16, 2010

(65) Prior Publication Data
US 2011/0199611 A1 Aug. 18, 2011

(51) Int. Cl.
G01N 21/31 (2006.01)
(52) U.S. Cl. .......................... 356/437; 356/436
(58) Field of Classification Search .......... 356/432–444, 356/244, 246; 250/574–575, 343, 226
See application file for complete search history.

(56) References Cited

U.S. PATENT DOCUMENTS

| | | | | |
|---|---|---|---|---|
| 5,616,826 A * | 4/1997 | Pellaux et al. | ............... | 73/24.02 |
| 5,912,740 A | 6/1999 | Zare et al. | | |
| 5,929,981 A * | 7/1999 | Keilbach | .......................... | 356/73 |
| 6,865,198 B2 * | 3/2005 | Taubman | ................. | 372/29.023 |
| 7,106,763 B2 * | 9/2006 | Tan et al. | ........................... | 372/9 |
| 7,145,165 B2 * | 12/2006 | Cox et al. | ....................... | 250/573 |
| 7,154,595 B2 * | 12/2006 | Paldus et al. | .................... | 356/73 |
| 7,541,589 B2 * | 6/2009 | Srivastava et al. | ......... | 250/361 R |
| 7,586,114 B2 * | 9/2009 | Cole et al. | ...................... | 250/575 |
| 7,649,189 B2 * | 1/2010 | Cole | .............. | 250/573 |
| 7,656,532 B2 * | 2/2010 | Cole | ............................. | 356/432 |
| 7,663,756 B2 * | 2/2010 | Cole | ............................. | 356/437 |
| 7,810,376 B2 * | 10/2010 | Koulikov | ..................... | 73/23.31 |
| 2009/0185175 A1 | 7/2009 | Cole et al. | | |
| 2010/0296095 A1 * | 11/2010 | Hong et al. | ................... | 356/436 |

FOREIGN PATENT DOCUMENTS
EP 2138831 A1 12/2009

OTHER PUBLICATIONS

"European Application Serial No. 11153890, European Search Report dated May 11, 2011", 3 pgs.
Paldus, B. A., et al., "Cavity-locked ring-down spectroscopy", Journal of Applied Physics, vol. 83, No. 8, (Apr. 15, 1998), 7.
"European Application Serial No. 1115389.06, Office Action Response filed Oct. 24, 2011", 6 pgs.
"European Application Serial No. 11153890.6 , European Search mailed May 11, 2011", 3 pgs.
"European Application Serial No. 11153890.6, Office Action mailed Jun. 29, 2011", 6 pgs.

* cited by examiner

*Primary Examiner* — Sang Nguyen
(74) *Attorney, Agent, or Firm* — Schwegman, Lundberg & Woessner, P.A.

(57) ABSTRACT

A cavity ring-down spectroscope includes a ring-down cavity. A trigger detector is optically coupled within the ring-down cavity to generate a signal to indicate a desired radiation level in the ring-down cavity. A controller is coupled to the trigger detector to control light provided to the ring-down cavity. A ring-down time may then be measured.

17 Claims, 3 Drawing Sheets

DETECTOR FOR CAVITY RING-DOWN SPECTROSCOPY

BACKGROUND

Cavity ring-down spectroscopy (CRDS) systems include a cavity that reflects light within the cavity to provide a long path through a sample. The decay of light intensity from the cavity over time may be used to determine the strength of absorption of the sample. From a known absorption cross section at a probe wavelength, and the cavity loss from the sample measured by a ring-down time, a measurement of the sample, such as gas concentration, may be obtained. While achieving the input and output through a single mirror has significant benefits in terms of light intensity, some systems keep the cavity in resonance with a laser wavelength by tuning the path length using a piezoelectrically driven tuning mirror. Since a reflected portion of input light directly is coincident with ambient light, the former can perturb the measurement of cavity light and make it difficult to determine when light is coupled into the cavity or just reflected onto the detector without reaching the cavity.

SUMMARY

A cavity ring-down spectroscope includes a ring-down cavity. A trigger detector is optically coupled within the ring-down cavity to generate a signal to indicate a desired radiation level in the ring-down cavity. A controller is coupled to the trigger detector to control light provided to the ring-down cavity. A ring-down time may then be measured.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
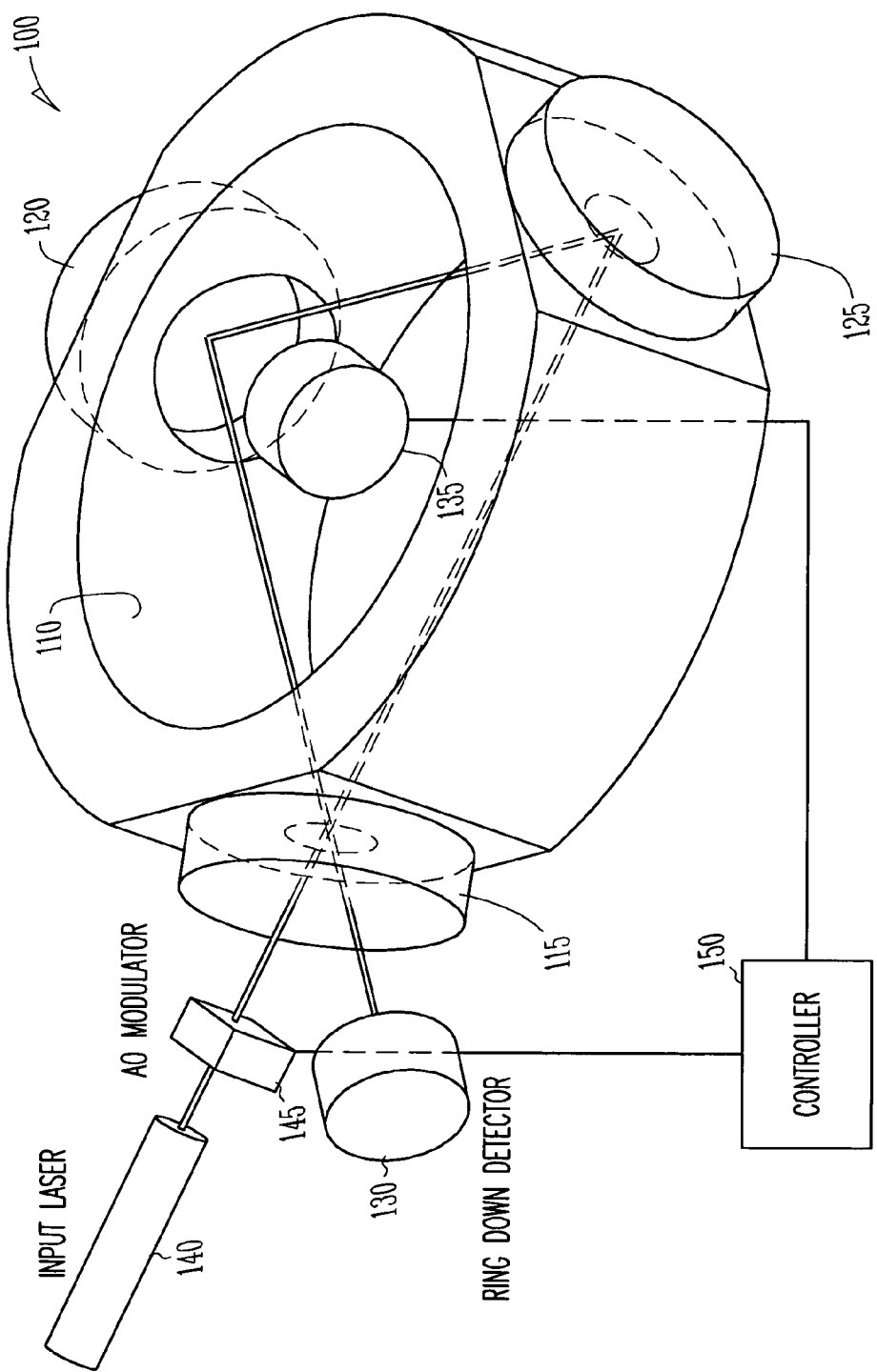
FIG. 1 is a block diagram of a cavity ring-down spectroscope according to an example embodiment.

FIG. 1 is a block diagram of a cavity ring-down system (CRDS) 100 having a cavity 110 in which light is reflected between two or more mirrors through a sample containing molecules of interest. The cavity 110 may have several mirrors 115, 120, and 125 in order to reflect the light, such as in a triangular path. Some of the mirrors, such as mirrors 120 and 125 may be totally reflective, such that no light transmits through them. Such mirrors improve the quality of the system 100, since at least two of the mirrors do not contribute to a total transmission loss in system 100. A high Q resonant structure is desired in one embodiment. Mirror 115 may be at least partially transmissive, allowing a portion of the reflected light to be detected by a ring-down detector 130.

In one embodiment, at least mirror 120 exhibits some light scattering, which is also a part of the total losses of the system 100. An internal cavity intensity detector 135 is positioned proximate mirror 120 in order to detect the scatter loss. When the scatter loss reaches a predetermined threshold level, the pump light is stopped. In one embodiment, the light is provided by an input laser 140, and is controlled by an acousto-optic (AO) modulator 145.

Scatter at ppm levels may be created in a mirror by a number of ways in various embodiments. In one embodiment, a film with an intentional controlled degree of crystallinity may be formed on a top surface of the mirror. Crystallinity can be generated by annealing to a sufficiently high temperature such that the thin film material generates scatter sites. Scatter may also be generated by roughing up the surface of the mirror. This can be done by gently milling the surface of the mirror with an ion beam to produce a controlled level of scatter in the ppm range which is generated by surface roughness. A desired amount of scatter can also be generated by having an index mismatch at a microscopic level by controllably adding impurities or scatter sites. In one embodiment, the level of scatter is small enough not to significantly adversely affect the power levels of laser light, yet large enough to be detected by internal cavity detector 135.

In further embodiments, the input laser and AO modulator may be combined in a single device, or a different device such as a mirror may be used to control whether light is pumped into the cavity 110 or not. The acousto-optic modulator (AOM), also referred to as a Bragg cell, uses the acousto-optic effect to diffract and shift the frequency of light using sound waves (usually at radio-frequency).

At a predetermined light level, the trigger detector 135 signals the AO modulator 145 such as via a controller 150 to cause input radiation from laser 140 to be no longer provided to the cavity 110. The ring-down detector 130 is positioned to measure the decay of light as transmitted through mirror 115, without having to account for additional light being pumped into the cavity from the laser 140. In one embodiment, the time it takes for the light within the cavity to decay, is representative of the amount or presence of an element within the cavity for which the light source and cavity are tuned to detect.

The internal cavity intensity detector 135, sometimes referred to as the trigger detector, may be mounted in a variety of different positions, such as near one of the mirrors within the cavity. The detector 135 may be positioned optimally where scatter occurs to efficiently detect the intensity of light being reflected within the cavity. In one embodiment, scatter off of one of the internal mirrors is observed. While the scattered light has low intensity since the mirror loss is low in the ppm range, the magnitude of the cavity light intensity provides a sufficiently strong signal for activating the AO modulator. In some prior approaches, a trigger detector is positioned outside the cavity and detects light transmitted through a mirror with a nominal 1 ppm or so transmission loss. The detector looks at the build up of light transmitted through this mirror.

When the intensity in the internal detector 135 builds up to a high level, the detector triggers the AO modulator 145 via controller 150 which causes the input laser light to the cavity to extinguish. At this time, the only light reaching the decay detector is light from the cavity. The light may decay sufficiently within 10 μsec in one embodiment, allowing it to travel a long path length through the molecules, such as 3 kilometers in this embodiment. The light decays because of system losses, such as mirror transmission and scattering losses, and also because of absorption by a sample gas containing molecules of interest. In one embodiment, the loss due to the gas is comparable in magnitude to the system losses.

For the period of time to charge the cavity with light and allow it to decay, on the order of a msec in one embodiment, the cavity is blind and can go out of resonance by thermal drifting. When the ring down is completed, normally within less than a msec, the input light may be redirected to the cavity via the AO modulator state change and a piezo mirror moves slightly and in conjunction with the trigger detector finds the new mirror position at which condition at which the internal cavity intensity is restored to begin another cycle. The piezo mirror may be any of mirrors 115, 120. Mirror 125 usually does not have a piezoelectric element because it must transmit the laser light into the cavity and the exiting cavity light onto the detector.

Controller 150 as shown receives sensed scatter information from detector 135 and controls the AO modulator 145 to extinguish light input into the cavity 110. Controller 150, or other separate controllers may be used to coordinate various other detectors, modulators and mirrors in various embodiments.

Figure 2:
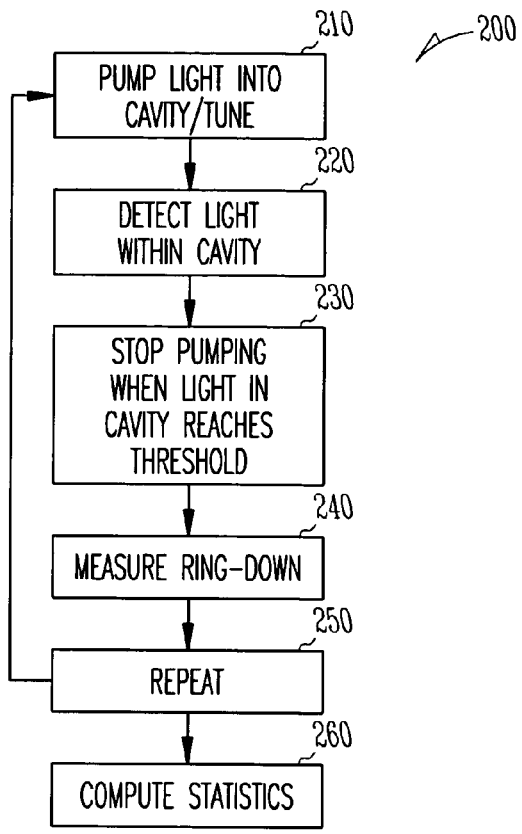
FIG. 2 is a flow chart illustrating a method of operating the spectroscope according to an example embodiment.

In one embodiment, controller 150 or another controller assists in implementation of an algorithm as illustrated in a flowchart 200 in FIG. 2. At 210, light is pumped into the cavity, and the cavity is optionally tuned to a desired frequency consistent with the light source and the molecules to be detected. The internal detector 135, or ring-down detector 135 may be used to measure the light within the cavity 110 and assist in the tuning.

At 220, following the optional tuning, light intensity is detected within the cavity by internal detector 135. The pumping is stopped at 230 when light in the cavity is detected at a predetermined threshold level. After the pumping is stopped, the ring-down detector 130 is used to detect the amount of time that it takes light to decay to a desired level at 240. The process is repeated as indicated at 250, again optionally including tuning to compensate at least for thermal drift. Multiple ring down measurements may be performed, and a statistical computation, such as average ring-down time, may be performed at 260 and associated with whether or not the desired molecule is present. The statistical analysis in some embodiments may allow detection of molecules in the range of parts per trillion.

By using an internal intensity detector, the mirrors used to reflect light may have lower transmission losses, allowing a system to have a high Q. The only loss may be through a mirror allowing light to reach the ring-down detector. By detecting scatter using an internal detector, the direct laser light does not adversely affect the detection that triggers shutting off the laser. The use of a three mirror, triangular configuration preserves polarization of the laser light, further allowing for a resonator cavity having an increased quality factor, Q. It also allows the ring-down detector to not receive direct laser light.

Figure 3:
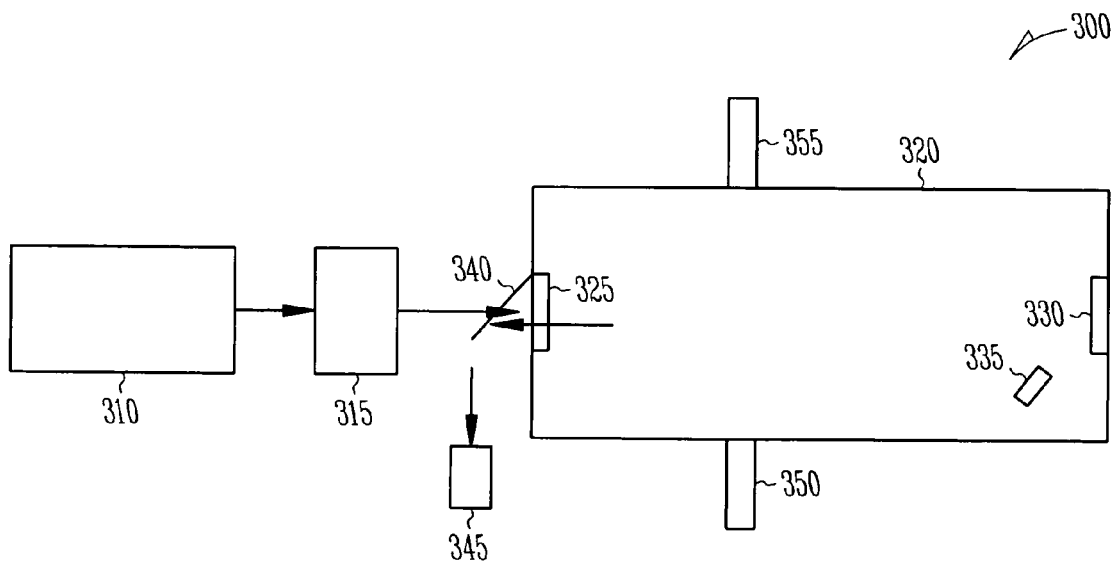
FIG. 3 is a block diagram of an alternative cavity ring-down spectroscope according to an example embodiment.

An alternative two mirror system is illustrated at 300 in block diagram format in FIG. 3. A laser 310 and AO modulator 315 provide light to a cavity 320 via a first mirror 325. Light is reflected back and forth in cavity 320 between first mirror 325 and a second mirror 330. An internal light detector 335 is positioned proximate second mirror 330 to detect light scattering representative of overall light intensity within the cavity 320. A third mirror 340 is positioned such that the laser light passes through it to enter the cavity 320, but also reflect light transmitted out of the cavity 320 through first mirror 325. The light is reflected onto a ring-down detector 345. This system 300 operates in a manner similar to that illustrated in FIG. 2, but utilizes only two mirrors to provide a long light path length through the molecules to be detected within the cavity.

In one embodiment, a gas input 350 and output 355 may be provided. The gas containing molecules to be detected may be provided via the input 350 and removed from the cavity via output 355. In one embodiment, the gas is provided and held within the cavity while detection occurs. In further embodiments, the gas may be flowing during detection so as not to interrupt an industrial process flow. The input and output may be smaller in cross section than the cavity, or may be the same size or even larger if desired. The ring shaped detector in FIG. 1 may be used in a similar manner. In further embodiments, the ring shaped detector may be disposed within a larger pipe carrying molecules of potential interest. The ring shaped detector may be the same size as the pipe, and positioned similar to a washer between sections of pipe.

Figure 4:
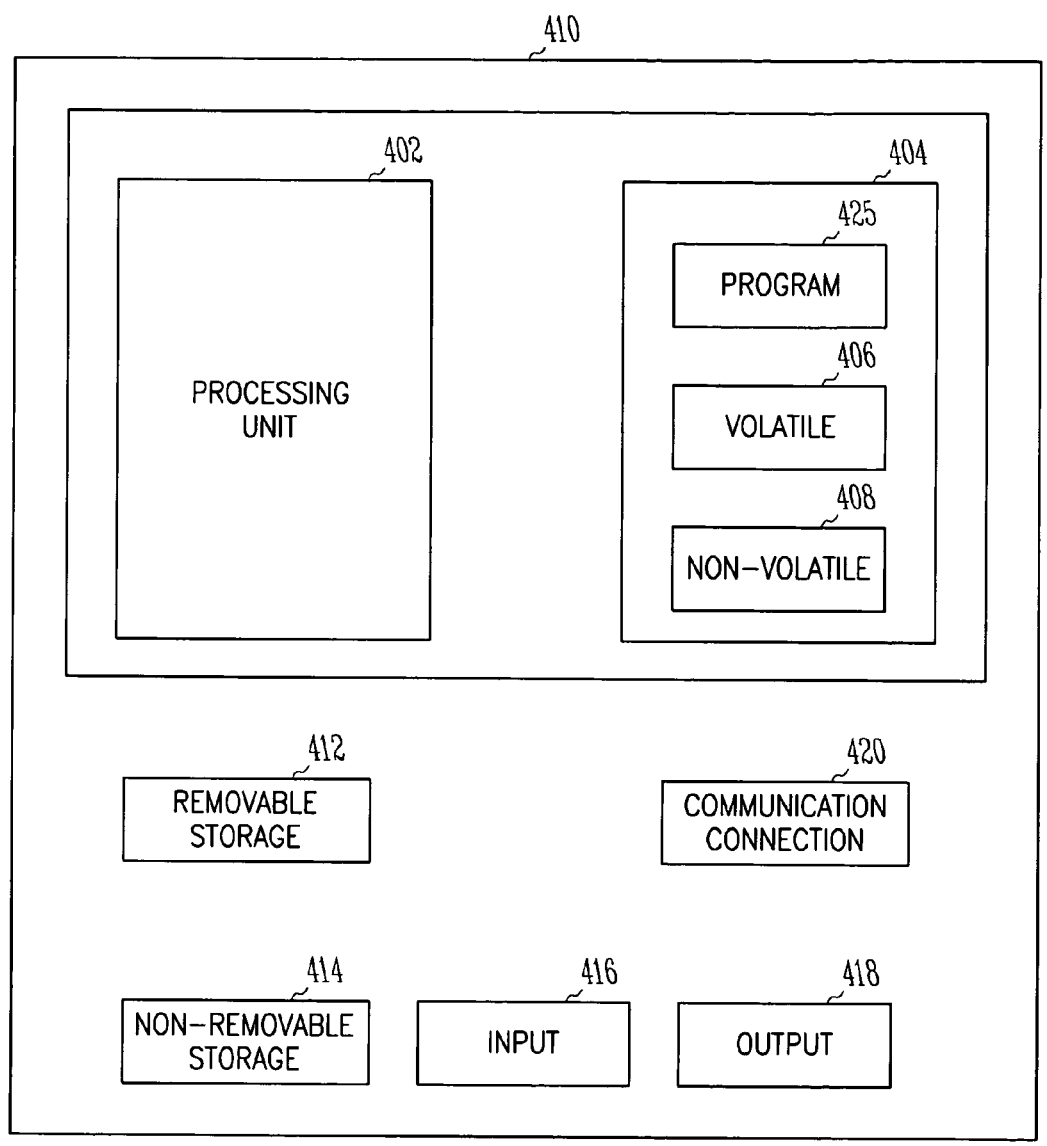
FIG. 4 is a block diagram of an example system for performing methods according to an example embodiment.

A block diagram of a computer system that executes programming for performing the above algorithm is shown in FIG. 4. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions to execute methods and algorithms described above may be stored on a computer-readable medium such as illustrated at a program storage device 425 are executable by the processing unit 402 of the computer 410. A hard drive, CD-ROM, and RAM are some examples of articles including a computer-readable medium.

The Abstract is provided to comply with 37 C.F.R. §1.72(b) is submitted with the understanding that it will not be used to interpret or limit the scope or meaning of the claims.

The invention claimed is:

1. A device comprising:
a ring-down cavity;
a decay detector optically coupled to the ring-down cavity to detect decay of light from the ring-down cavity;
a trigger detector optically coupled within the ring-down cavity to generate a signal to indicate a desired radiation level in the ring-down cavity; and
a controller coupled to the trigger detector to control light provided to the ring-down cavity.

2. The device of claim 1 wherein the controller is operable to iteratively control light to the ring-down cavity following each ring-down of light from the desired radiation level.

3. The device of claim 1 wherein the trigger detector detects light scattered off a minor in the ring-down cavity having a surface conditioned to provide a desired amount of scatter.

4. The device of claim 3 wherein the mirror surface is conditioned by at least one of annealing, milling, and index mismatching on a microscopic level.

5. The device of claim 1 and further comprising a laser light source optically coupled to the ring-down cavity to provide light to the ring-down cavity.

6. The device of claim 5 wherein multiple detections of ring-down times are statistically combined to provide an indication of the presence of a target molecule.

7. A method comprising:
providing light to a ring-down cavity having a sample to be detected;
detecting a desired radiation level via a detector positioned within the ring-down cavity;
stopping the providing of light to the ring-down cavity upon the desired radiation level being detected, wherein stopping the providing of light is controlled by an acousto-optic modulator; and
measuring a ring-down time of light within the ring-down cavity.

8. The method of claim 7, wherein the detector positioned within the ring-down cavity is positioned to detect light scattered from a mirror having a surface conditioned to provide a desired amount of scatter in the ring-down cavity.

9. The method of claim 8 wherein light is provided by a laser light source optically coupled to the ring-down cavity.

10. The method of claim 8 wherein light is iteratively provided to the ring-down cavity following each ring-down of light from the desired radiation level and the cavity is tuned prior to detecting a desired radiation level.

11. The method of claim 10 wherein iterative ring-down measurements are statistically combined to provide an indication of the presence of a target molecule.

12. The method of claim 7 and further comprising repeating the method a predetermined number of times following each ring-down of light within the ring-down cavity.

13. The method of claim 7 and further comprising tuning the cavity to a desired resonant frequency during each period of providing light to the ring-down cavity.

14. A system comprising:
a ring-down cavity including three mirrors adapted to create a triangular light path through molecules within the cavity;
a decay detector optically coupled to the ring-down cavity to detect decay of light from the ring-down as a function of light transmitted out of the ring-down cavity from a selected mirror;
a trigger detector optically coupled within the ring-down cavity to detect light scattering from at least one of the mirrors and to generate a trigger signal to indicate a desired radiation level in the ring-down cavity; and
a controller coupled to the trigger detector to control light provided to the ring-down cavity as a function of the trigger signal.

15. The system of claim 14 wherein the controller controls an acousto-optic modulator.

16. The system of claim 14 wherein one of the mirrors has a surface conditioned to provide a desired amount of scatter for detection by the trigger detector.

17. The system of claim 14 wherein the controller is operable to iteratively provide light to the ring-down cavity following each ring-down of light from the desired radiation level.

* * * * *